(12) United States Patent
Peng

(10) Patent No.: US 9,260,073 B2
(45) Date of Patent: Feb. 16, 2016

(54) WARNING SYSTEM AND WARNING METHOD UTILIZING SAME

(71) Applicant: HON HAI PRECISION INDUSTRY CO., LTD., New Taipei (TW)

(72) Inventor: Da-Yi Peng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/546,182

(22) Filed: Nov. 18, 2014

(65) Prior Publication Data

US 2015/0137999 A1    May 21, 2015

(30) Foreign Application Priority Data

Nov. 21, 2013    (CN) .......................... 2013 1 0588699

(51) Int. Cl.
| | |
|---|---|
| *G08G 1/00* | (2006.01) |
| *B60R 21/02* | (2006.01) |
| *B60N 2/00* | (2006.01) |
| *B60Q 1/52* | (2006.01) |
| *B60R 21/00* | (2006.01) |

(52) U.S. Cl.
CPC ................ *B60R 21/02* (2013.01); *B60N 2/002* (2013.01); *B60Q 1/525* (2013.01); *B60R 2021/003* (2013.01); *B60R 2021/0032* (2013.01)

(58) Field of Classification Search
CPC ............ B60N 2/00; B60N 2/02; B60N 2/002; B60N 2002/0268
USPC .......................................... 340/901, 664–667
See application file for complete search history.

(56) References Cited

U.S. PATENT DOCUMENTS

| | | | | |
|---|---|---|---|---|
| 7,250,869 | B2 * | 7/2007 | Davis ....................... | B60N 2/26 340/539.11 |
| 7,319,378 | B1 * | 1/2008 | Thompson ............ | B60R 25/102 340/426.1 |
| 7,523,803 | B2 * | 4/2009 | Breed ...................... | H04Q 9/00 180/273 |
| 2008/0048886 | A1 * | 2/2008 | Brown ................. | G08G 1/0175 340/937 |
| 2008/0195261 | A1 * | 8/2008 | Breed ................. | B60R 21/0132 701/2 |
| 2013/0267194 | A1 * | 10/2013 | Breed ..................... | H04W 4/22 455/404.2 |

* cited by examiner

*Primary Examiner* — Eric Blount
(74) *Attorney, Agent, or Firm* — Novak Druce Connolly Bove + Quigg LLP

(57) ABSTRACT

A warning system applied to a vehicle includes a control module, a detecting module, a warning module, and a pressure sensor module. The pressure sensor module is assembled to a seat, and configured to measure a pressure value of the seat and transmit the pressure value to the control module. The detecting module is configured to obtain information of the environment around the vehicle and transmit the information to the control module. The control module is configured to determine whether there is at least one person sitting on the seat based on the pressure value on the seat, and to determine whether there is a passing vehicle based on the information of the environment surrounding the vehicle, and warn the passing vehicle when there is someone sitting on the seat and there is a passing vehicle.

14 Claims, 3 Drawing Sheets

WARNING SYSTEM AND WARNING METHOD UTILIZING SAME

FIELD

The subject matter herein generally relates to the field of vehicle safety protection, and in particular to a vehicle warning system and a warning method utilizing same.

BACKGROUND

When passengers need to get off a vehicle and do not pay attention to the environment around the vehicle, traffic accidents can easily happen.

BRIEF DESCRIPTION OF THE DRAWINGS

Implementations of the present technology will now be described, by way of example only, with reference to the attached figures.

DETAILED DESCRIPTION

Figure 1:
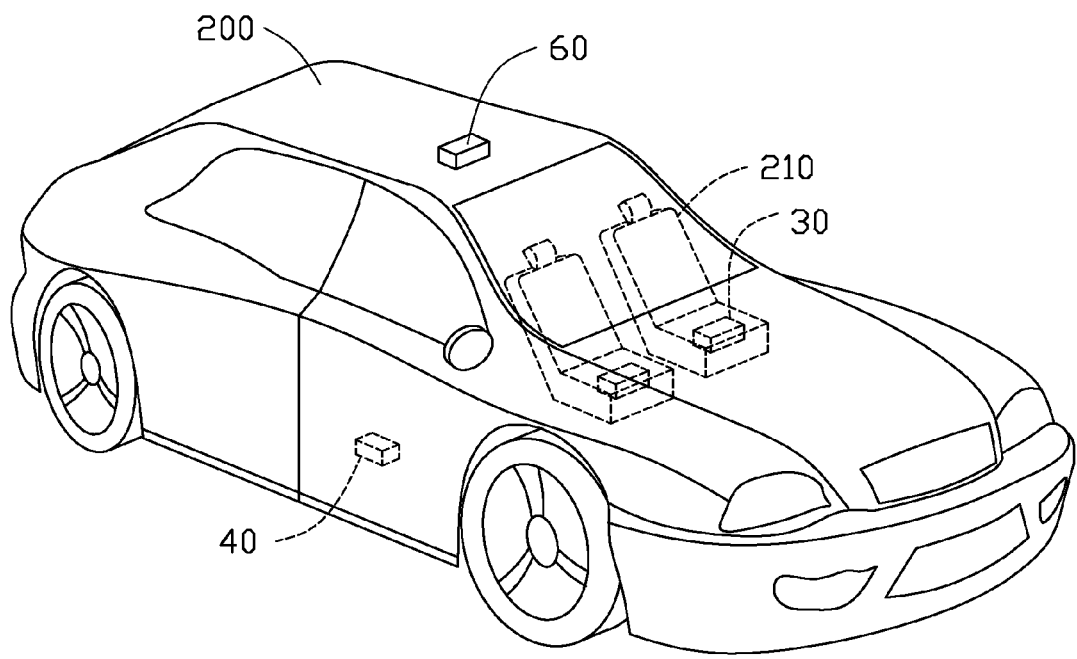
FIG. 1 is an isometric view of an embodiment of a vehicle equipped with a warning system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

A warning system applied for a vehicle. The vehicle can include a seat. The system can include a control module, a detecting module assembled to the vehicle and electrically coupled to the control module, a warning module assembled to the vehicle and electrically coupled to the control module, and a pressure sensor module assembled to a seat of the vehicle and electrically coupled to the control module. The pressure sensor module can be configured to measure a pressure value of the seat and transmit the pressure value to the control module. The control module is configured to calculate a pressure difference between the pressure value and a pre-pressure value to determine whether there is at least one person sitting on the seat. The detecting module is configured to obtain information of the environment around the vehicle and transmit the information to the control module. The control module is further configured to determine whether there is a passing vehicle based on the information and control the warning module to warn the passing vehicle when there is someone sitting on the seat and there is a passing vehicle.

A warning method can be applied to a vehicle. The vehicle can include a seat. The method can include following procedures: measuring a pressure value of the seat; calculating a pressure difference between the pressure value and a predetermined value to determine whether there is at least one person sitting on the seat; obtaining information of the environment around the vehicle; determining whether there is a passing vehicle based on the information; and warning the passing vehicle when there is at least one person sitting on the seat and there is a passing vehicle.

Figure 2:
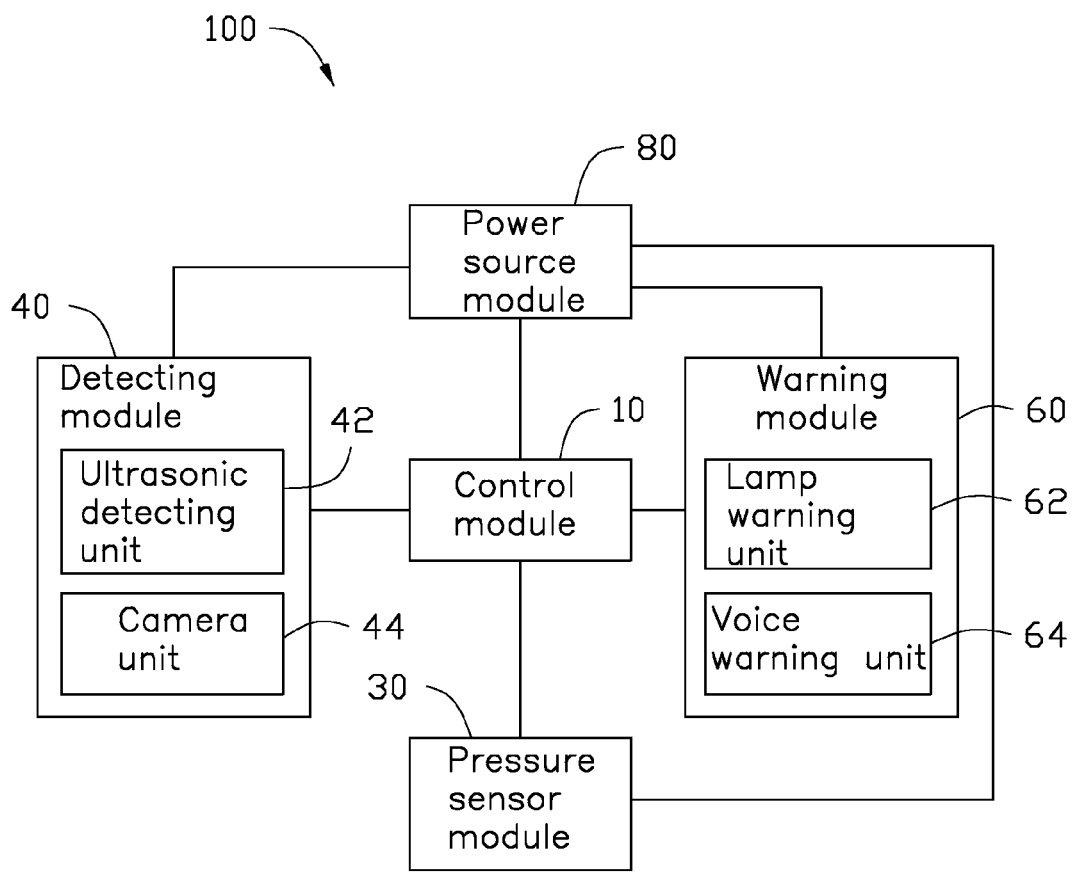
FIG. 2 is a block diagram of an embodiment of a warning system.

FIGS. 1 and 2 illustrate that an embodiment of a warning system 100 is applied to a vehicle 200. The warning system 100 can be configured to warn the other vehicles (not shown) passing the vehicle 200 to keep a distance from the vehicle 200, so as to avoid bumping into the passengers getting out of the vehicle 200. The vehicle 200 can include a number of seats 210. The warning system 100 can include a control module 10, a number of pressure sensor modules 30, a detecting module 40, a warning module 60, and a power source module 80. The control module 10, the pressure sensor modules 30, the detecting module 40, and the warning module 60 can be electrically coupled to the power source module 80, respectively. The pressure sensor modules 30, the detecting module 40, and the warning module 60 can be electrically coupled to the control module 10, respectively.

The pressure sensor modules 30 can be assembled to the seats 210 of the vehicle 200 and be electrically coupled to the control module 10, respectively. Each pressure sensor module 30 can be configured to measure a pressure value of the corresponding seat 210, and can transmit the pressure value to the control module 10.

The control module 10 can be assembled to the vehicle 200. The control module 10 can calculate a pressure difference between each pressure value and a predetermined value to determine whether there is at least one passenger sitting on the seats 210. The predetermined value can be received when there is nobody on the seat 210; when the pressure value is equal to the predetermined value, the control module 10 can determine that there is nobody on the seat 210; when the pressure value is not equal to the predetermined value, the control module 10 can determine that there is someone sitting on the seat 210. In at least one embodiment, the predetermined value can be received when there is somebody on the seat 210; when the pressure value is equal to the predetermined value, the control module 10 can determine that there is somebody on the seat 210; when the pressure value is not equal to the predetermined value, the control module 10 can determine that there is nobody on the seat 210. The pressure sensor modules 30 can be started when the vehicle 200 is in a neutral position or a parked position. In at least one embodiment, the pressure sensor modules 30 can be started when the vehicle 200 is moving.

The detecting module 40 can be assembled to two opposite sides of the vehicle 200 and be electrically coupled to the control module 10. The detecting module 40 can be configured to obtain information of the environment around the vehicle 200, and can transmit the information to the control module 10. The control module 10 can analyze the information to determine whether there is a vehicle passing the vehicle 200.

In at least one embodiment, the detecting module 40 can measure the information of the environment within an area around the vehicle 200 less then predetermined distance. For example, the predetermined distance can be five meters, the detecting module 40 can measure the information of the environment within the area around the vehicle 200 is less then five meters, and can transmit the information to the control module 10. In at least one embodiment, the predetermined distance can be adjusted according to the need. In at least one embodiment, the detecting module 40 can be assembled to one side of the vehicle 200 or a top surface of the vehicle 200.

The detecting module 40 can include an ultrasonic detecting unit 42 and a camera unit 44. The ultrasonic detecting unit 42 can transmit and receive ultrasonic signals, and can be configured to measure a distance value between the vehicle 200 and another vehicle based on the ultrasonic signals. The ultrasonic detecting unit 42 can transmit the distance value to the control module 10. The control module 10 can analyze the distance value to determine whether there is another vehicle passing the vehicle 200. The camera unit 44 can be configured to take images around the vehicle 200 in real time and can transmit the images to the control module 10. The control module 10 can analyze the images to determine whether there is another vehicle passing the vehicle 200.

The warning module 60 can be assembled to the top surface of the vehicle 200 and be electrically coupled to the control module 10. The warning module 60 can include a lamp warning unit 62 and a voice warning unit 64. When the control module 10 determines that there is at least one passenger sitting on the seats 210 and there is a passing vehicle, the control module 10 can respectively control the lamp warning unit 62 and the voice warning unit 64 to warn the other vehicle.

The power source module 80 can provide a working voltage to the pressure sensor modules 30, the detecting module 40, and the warning module 60, respectively.

When the vehicle 200 is in a neutral position or a parked position, and some passengers need to get out of the vehicle 200, the warning system 100 can warn the passing vehicles to keep away from the passengers getting off.

Figure 3:
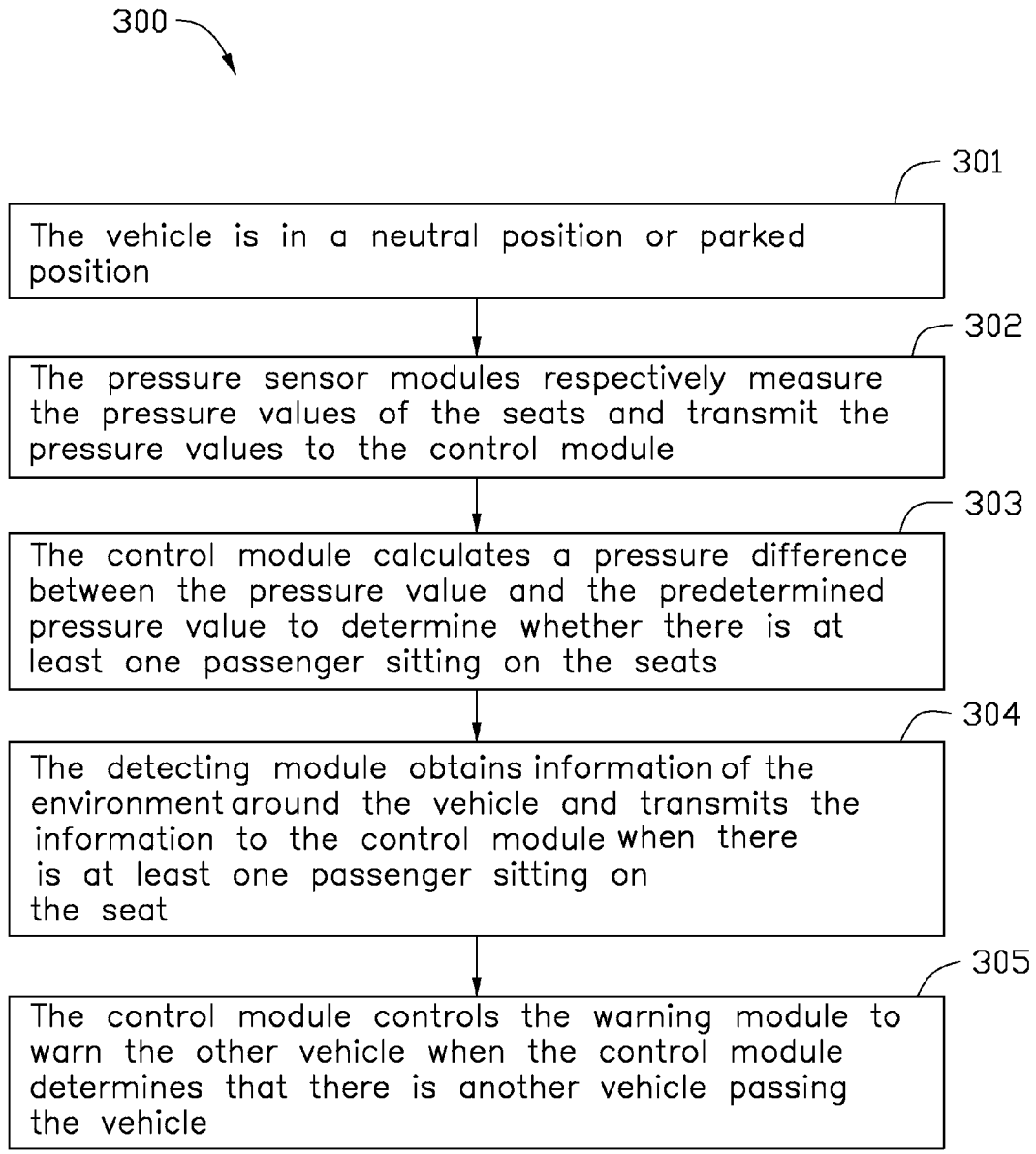
FIG. 3 is a flowchart of an embodiment of a warning method using the system of FIG. 1.

FIG. 3 illustrates a flowchart in accordance with an example embodiment. The example method 300 is provided by way of example, as there are a variety of ways to carry out the method. The method 300 described below can be carried out using the configurations illustrated in FIG. 3, for example, and various elements of these figures are referenced in explaining example method 300. Each block shown in FIG. 3 represents one or more processes, methods or subroutines, carried out in the example method 300. Additionally, the illustrated order of blocks is by example only and the order of the blocks can change according to the embodiment. The example method 300 for warning passing vehicles can begin at block 301.

At block 301, the vehicle is in a neutral position or parked position.

At block 302, the pressure sensor modules respectively measure the pressure values of the seats and transmit the pressure values to the control module.

At block 303, the control module calculates a pressure difference between the pressure value and the predetermined pressure value to determine whether there is at least one passenger sitting on the seats. The control module can calculate each pressure difference of the corresponding seat to determine whether there is at least one passenger sitting on the corresponding seat, respectively.

At block 304, the detecting module obtains the information of an environment around the vehicle and transmits the information to the control module when there is at least one passenger sitting on the seat. The detecting module can be started, so long as the control module determines that there is one passenger sitting on the seats. In at least one embodiment, when the control module determines that there is nobody sitting on the seats, the detecting module can be not started.

At block 305, the control module controls the warning module to warn the other vehicle when the control module determines that there is a passing vehicle. In at least one embodiment, when the control module determines that there is no passing vehicle, the warning module can be not started.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A warning system applied for a vehicle, the vehicle comprising a seat, the system comprising:
   a control module,
   a detecting module assembled to the vehicle and electrically coupled to the control module;
   a warning module assembled to the vehicle and electrically coupled to the control module; and
   a pressure sensor module assembled to a seat of the vehicle and electrically coupled to the control module;
   wherein the pressure sensor module is configured to measure a pressure value of the seat and transmit the pressure value to the control module, the control module is configured to calculate a pressure difference between the pressure value and a predetermined value to determine whether there is at least one person sitting on the seat; and
   wherein the detecting module is configured to obtain information of the environment around the vehicle and transmit the information to the control module, and the control module is further configured to determine whether there is a passing vehicle based on the information and control the warning module to warn the passing vehicle when there is someone sitting on the seat and there is a passing vehicle.

2. The warning system of claim 1, wherein the detecting module comprises an ultrasonic detecting unit, the ultrasonic detecting unit is configured to transmit and receive ultrasonic signals, and is capable of measuring a distance module between the vehicle and another vehicle based on the ultrasonic signals and transmitting the distance value to the control module, the control module is configured to analyze the distance value to determine whether there is a passing vehicle.

3. The warning system of claim 1, wherein the detecting module comprises a camera unit, the camera unit is configured to take images around the vehicle and transmit the images to the control module, the control module is configured to analyze the images to determine whether there a passing vehicle.

4. The warning system of claim 1, wherein the warning module comprises a lamp warning unit, the control module control the lamp warning unit to warn the passing vehicle.

5. The warning system of claim 1, wherein the warning module comprises a voice warning unit, the control module control the voice warning unit to warn the passing vehicle.

6. The warning system of claim 1, wherein the warning system further comprises a power source module, the control module, the pressure sensor module, the detecting module, and the warning module are electrically coupled to the power source module respectively.

7. The warning system of claim 1, wherein the detecting module is configured to obtain the information within an area around the vehicle less then predetermined distance.

8. The warning system of claim 1, wherein the detecting module is assemble to a side of the vehicle.

9. The warning system of claim 1, wherein the warning module is assembled to a top surface of the vehicle.

10. A warning method applied to a vehicle, the vehicle comprising a seat, the method comprising:
    measuring a pressure value of the seat;
    calculating a pressure difference between the pressure value and a predetermined value to determine whether there is at least one person sitting on the seat;
    obtaining information of the environment around the vehicle;
    determining whether there is a passing vehicle based on the information; and
    warning the passing vehicle when there is at least one person sitting on the seat and there is a passing vehicle.

11. The warning method of claim 10, wherein the method further comprises:
    transmitting and receiving ultrasonic signals to obtaining the information of the environment around the vehicle.

12. The warning method of claim 10, wherein the method further comprises:
    taking images around the vehicle to obtain the information of the environment around the vehicle.

13. The warning method of claim 10, wherein the vehicle comprises a warning module comprising a lamp warning unit, the method further comprises: controlling the lamp warning unit to warn the passing vehicle when there is at least one person sitting on the seat and there is a passing vehicle.

14. The warning method of claim 10, wherein the vehicle comprises a warning module comprising a voice warning unit, the method further comprises: controlling the voice warning unit to warn the passing vehicle when there is at least one person sitting on the seat and there is a passing vehicle.

* * * * *